United States Patent
Kim et al.

(10) Patent No.: US 6,724,854 B1
(45) Date of Patent: Apr. 20, 2004

(54) PROCESS TO MITIGATE STRESS CORROSION CRACKING OF STRUCTURAL MATERIALS IN HIGH TEMPERATURE WATER

(75) Inventors: Young-Jin Kim, Clifton Park, NY (US); Thomas Martin Angeliu, Clifton Park, NY (US); Peter Louis Andresen, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/462,113

(22) Filed: Jun. 16, 2003

(51) Int. Cl.[7] ............................ G21C 9/00; G21C 15/00
(52) U.S. Cl. ........................................ 376/306; 422/14
(58) Field of Search ................................ 376/305, 306; 422/14, 13

(56) References Cited

U.S. PATENT DOCUMENTS

| | | |
|---|---|---|
| 4,545,725 A | 10/1985 | Ikeda et al. |
| 4,842,811 A | 6/1989 | Desilva |
| 5,130,080 A | 7/1992 | Niedrach |
| 5,130,081 A | 7/1992 | Niedrach |
| 5,135,709 A | 8/1992 | Andresen et al. |
| 5,147,602 A | 9/1992 | Andresen et al. |
| 5,164,152 A | 11/1992 | Kim et al. |
| 5,571,394 A | 11/1996 | Hettiarachchi |
| 5,581,588 A | 12/1996 | Andresen |
| 5,600,691 A | 2/1997 | Hettiarachchi |
| 5,600,692 A | 2/1997 | Hettiarachchi |
| 5,602,888 A | 2/1997 | Hettiarachchi |
| 5,608,766 A | 3/1997 | Andresen et al. |
| 5,673,297 A | 9/1997 | Andresen |
| 5,719,911 A | 2/1998 | Hettiarachchi |
| 5,768,330 A | 6/1998 | Andresen et al. |
| 5,773,096 A | 6/1998 | Hettiarachchi et al. |
| 5,774,516 A | 6/1998 | Hettiarachchi et al. |
| 5,793,830 A | 8/1998 | Kim et al. |
| 5,805,653 A | 9/1998 | Hettiarachchi |
| 5,818,893 A | 10/1998 | Hettiarachchi |
| 5,904,991 A | 5/1999 | Hettiarachchi |
| 6,168,382 B1 | 1/2001 | Nolan et al. |
| 6,344,098 B1 | 2/2002 | Manning et al. |
| 6,473,480 B1 | 10/2002 | Kruger et al. |
| 2002/0080906 A1 | 6/2002 | Andresen et al. |
| 2002/0101953 A1 | 8/2002 | Hettiarachchi et al. |
| 2002/0118787 A1 | 8/2002 | Andresen et al. |
| 2002/0181644 A1 | 12/2002 | Hettiarachchi et al. |
| 2003/0012686 A1 | 1/2003 | Andresen et al. |

*Primary Examiner*—Harvey E. Behrend
(74) *Attorney, Agent, or Firm*—Patrick K. Patnode; Christian G. Cabou

(57) ABSTRACT

A method for mitigating stress corrosion cracking in high temperature water includes introducing catalytic nanoparticles and dielectric nanoparticles to the high temperature water in an amount effective to reduce a electrochemical corrosion potential of the high temperature water.

27 Claims, 5 Drawing Sheets

PROCESS TO MITIGATE STRESS CORROSION CRACKING OF STRUCTURAL MATERIALS IN HIGH TEMPERATURE WATER

BACKGROUND

This disclosure generally relates to mitigating stress corrosion cracking of components exposed to high temperature water, and more particularly, reducing a corrosion potential of the components.

Nuclear reactors are used in electric power generation, research, and propulsion. A reactor pressure vessel contains the reactor coolant, i.e. water, which removes heat from the nuclear core. Respective piping circuits carry the heated water or steam to the steam generators or turbines and carry circulated water or feed water back to the vessel. Operating pressures and temperatures for the reactor pressure vessel are about 7 Mpa and about 288° C. for a boiling water reactor (BWR), and about 15 Mpa and 320°C. for a pressurized water reactor (PWR). The materials used in both BWRs and PWRs must withstand various loading, environmental, and radiation conditions.

Some of the materials exposed to high-temperature water include carbon steel, low alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves, and buildup of the gamma radiation-emitting Co-60 isotope.

Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack-tip. The reactor components are subject to a variety of stresses associated with, e.g. differences in thermal expansion, the operating pressure needed for the containment of the reactor cooling water, and other sources such as residual stress from welding, cold working and other asymmetric metal treatments. In addition, water chemistry, welding, crevice geometry, heat treatment, and radiation can increase the susceptibility of metal in a component to SCC.

It is well known that SCC occurs at higher rates when oxidizing species, e.g., $O_2$, $H_2O_2$, are present in the reactor water in concentrations of about 1 to 5 parts per billion (ppb) or greater. SCC is increased in a high radiation flux where oxidizing species, such as oxygen, hydrogen peroxide, and short-lived hydroxyl radicals, are produced from radiolytic decomposition of the reactor water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of, e.g., SCC, corrosion fatigue, corrosion film thickening and general corrosion.

In a BWR, the radiolysis of the primary water coolant in the reactor core causes the net decomposition of a small fraction of the water to the chemical products $H_2$, $H_2O_2$, $O_2$, and oxidizing and reducing radicals. For steady-state operating conditions, equilibrium concentrations of $H_2$, $H_2O_2$, and $O_2$ are established in both the water, which is recirculated, and the steam going to the turbine. This concentration of $H_2$, $H_2O_2$, and $O_2$ is oxidizing and results in conditions that can promote intergranular stress corrosion cracking of susceptible materials of construction. One method employed to mitigate intergranular stress corrosion cracking of susceptible material is the application of hydrogen water chemistry (HWC), whereby the oxidizing nature of the BWR environment is modified to a more reducing condition. This effect is achieved by adding gaseous hydrogen to the reactor feed water. When the hydrogen reaches the reactor vessel, it reacts with the radiolytically formed oxidizing species on metal surfaces to reform water, thereby lowering the concentration of dissolved oxidizing species in the water in the vicinity of metal surfaces and in the bulk water. The rate of these recombination reactions is dependent on local radiation fields, water flow rates, and other variables such as the oxide chemistry.

The injected hydrogen reduces the level of oxidizing species in the water, such as dissolved oxygen and hydrogen peroxide, and as a result lowers the ECP of metals in the water. However, factors such as variations in water flow rates, and the time or intensity of exposure to neutron or gamma radiation, result in the production of oxidizing species at different levels in different reactors. FIG. 1 shows the observed (data points) and predicted (curves) crack growth rates as a function of corrosion potential for 25 millimeter (mm) compact tension (CT) specimens of furnace sensitized Type 304 stainless steel (containing 18–20% Cr, 8–10.5% Ni and 2% Mn) at a constant load of 25 Ksi√in over the range of solution conductivities from 0.1 to 0.3 $\mu$S/cm. The data clearly shows the dependency of ECP on crack propagation rate. Data points at elevated corrosion potentials and crack propagation rates correspond to irradiated water chemistry conditions in test or commercial reactors. The shaded region at low corrosion potentials and crack propagation rates (labeled hydrogen water chemistry) correspond to normal water chemistry outside the core, i.e., non-irradiated. Thus, varying amounts of hydrogen have been required to reduce the levels of oxidizing species sufficiently to maintain the ECP below a critical potential required for protection from IGSCC in high-temperature water. As used herein, the term "critical potential" means a corrosion potential at or below a range of values of about –230 to about –300 millivolts (mV) based on the standard hydrogen electrode (SHE) scale. IGSCC proceeds at an accelerated rate in systems in which the ECP is above the critical potential, and at a substantially lower rate in systems in which the ECP is below the critical potential. Water containing oxidizing species such as oxygen and hydrogen peroxide increases the ECP of metals exposed to the water above the critical potential, whereas water with little or no oxidizing species present results in an ECP below the critical potential as shown.

Corrosion potentials of stainless steels and other structural materials in contact with reactor water containing oxidizing species can be reduced below the critical potential by injection of hydrogen into the feed water. For adequate feed water hydrogen addition rates, conditions necessary to inhibit intergranular stress corrosion cracking can be established in certain locations of the reactor. Different locations in the reactor systems require different levels of hydrogen addition. Much higher hydrogen injection levels are necessary to reduce the ECP within the high radiation flux of the reactor core or when oxidizing cationic impurities, e.g., cupric ion, are present.

It has been shown that intergranular stress corrosion cracking of Type 304 stainless steel used in BWRs can be mitigated by reducing the ECP of the stainless steel to values below about −230 mV(SHE). An effective method of achieving this objective is to use HWC. However, high hydrogen additions, e.g., of about 200 ppb or greater, that may be required to reduce the ECP below the critical potential, can result in a higher radiation level in the steam-driven turbine section from incorporation of the short-lived N-16 species in the steam. For most BWRs, the amount of hydrogen addition required to provide mitigation of intergranular stress corrosion cracking of pressure vessel internal components results in an increase in the main steam line radiation monitor by a factor of five to eight. This increase in main steam line radiation can cause high, even unacceptable, environmental dose rates that can require expensive investments in shielding and radiation exposure control. Thus, recent investigations have focused on using minimum levels of hydrogen to achieve the benefits of HWC with minimum increase in the main steam radiation dose rates.

An effective approach to achieve this goal is to either coat or alloy the component surface with a catalytic noble metal such as palladium, platinum, rhodium, and like noble metals. Such processes rely on the very efficient recombination kinetics of dissolved oxygen, hydrogen peroxide and hydrogen on catalytic surfaces. The presence of catalytic sites on the stainless steel surface reduces the hydrogen demand to reach the required intergranular stress corrosion cracking critical potential of −230 mV (SHE). The techniques used to date for coating noble metals include electroplating, electroless plating, hyper-velocity oxy-fuel, plasma deposition, and related high-vacuum deposition techniques. Noble metal alloying has been carried out using standard alloy preparation techniques. Also, noble metal coatings such as those applied to by plasma spraying and by hyper-velocity oxy-fuel must be applied to all surfaces that require protection, i.e., they afford no protection to adjacent uncoated regions.

The most critical requirement for intergranular stress corrosion cracking protection of Type 304 stainless steel is to lower its ECP to values below the critical protection potential, i.e., about −230 mV (SHE). The manner in which this potential is achieved is immaterial, e.g., by alloying, doping, or by any other method. It has been demonstrated that it is sufficient to dope the oxide film by the appropriate material (e.g., Pt) to achieve a state of lower ECP. It was shown in later work that a thickness of about 200 to 300 angstroms (Å) of the doping element is generally sufficient to impart this benefit of lower potential at low hydrogen concentrations. This is not surprising because the ECP is an interfacial property, and hence modifying the interface by a process such as doping would alter its ECP. The critical requirement is that the noble metal dopants remain on the surface over a long period of time to gain the maximum benefit from the doping action.

While the above noted processes are capable of reducing corrosion potential and can be used to mitigate SCC, there are still unknown factors in the core of BWRs that make these processes difficult to implement commercially. For example, dissolved hydrogen/oxygen levels, flow rates, temperature gradients, radiation fluxes and the like are difficult to monitor and as a result, seriously limit the effectiveness of the processes. Also, the high cost of hydrogen additions, increase in production of volatile N-16 compounds by the transmutation of O-16 to N-16 in the reactor core, and non-protection of uncoated regions adjacent to the noble metal coated surfaces present problems for successful introduction to plant systems.

Accordingly, there remains a need for an improved process for mitigating stress corrosion cracking by reducing the corrosion potential and providing insulative protection to the reactor components.

BRIEF SUMMARY

Disclosed herein is a method for mitigating stress corrosion cracking of a component exposed to high temperature water in a hot water system in which the presence of at least one oxidizing species in the high temperature water raises an electrochemical corrosion potential of the component, comprising introducing a reducing species to the high temperature water; introducing catalytic nanoparticles and dielectric nanoparticles into the high temperature water; and reducing the electrochemical corrosion potential of the high temperature water and forming an insulative barrier on or about the component.

In accordance with another embodiment, a method for mitigating stress corrosion cracking of a component exposed to high temperature water in a hot water system in which the presence of at least one oxidizing species in the high temperature water raises an electrochemical corrosion potential of the component, comprising introducing a reducing species to the high temperature water; introducing nanoparticles to the high temperature water and forming a colloidal suspension of the nanoparticles, wherein the nanoparticles comprise a mixture of catalytic nanoparticles and dielectric nanoparticles; and catalytically reducing a concentration of the at least one oxidizing species in the high temperature water and forming a protective barrier about the component.

In accordance with another embodiment, a method for mitigating stress corrosion cracking of a component exposed to high temperature water in a hot water system in which the presence of at least one oxidizing species in the high temperature water raises an electrochemical corrosion potential of the component, comprising introducing nanoparticles to the high temperature water in an amount effective to reduce a corrosion potential of the high temperature water, wherein the nanoparticles comprise a combination of a catalytic material and a dielectric material.

The above described and other features are exemplified by the following detailed description and figures.

DETAILED DESCRIPTION

Figure 1:
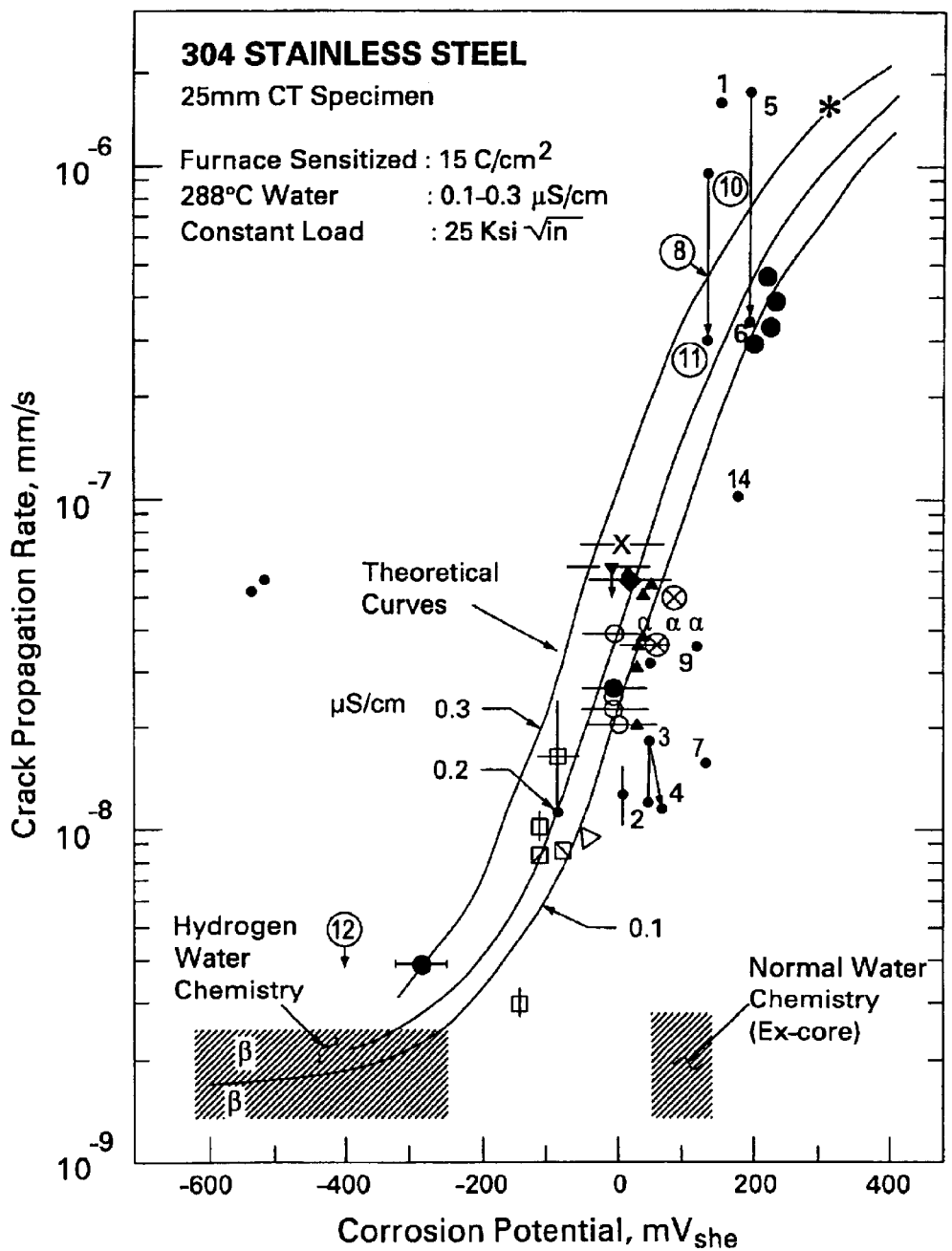
FIG. 1 graphically illustrates the crack propagation rate as a function of corrosion potential for Type 304 steel at a constant load of 25 Ksi√in over the range of solution conductivities from 0.1 to 0.3 $\mu$S/cm.
Figure 2:
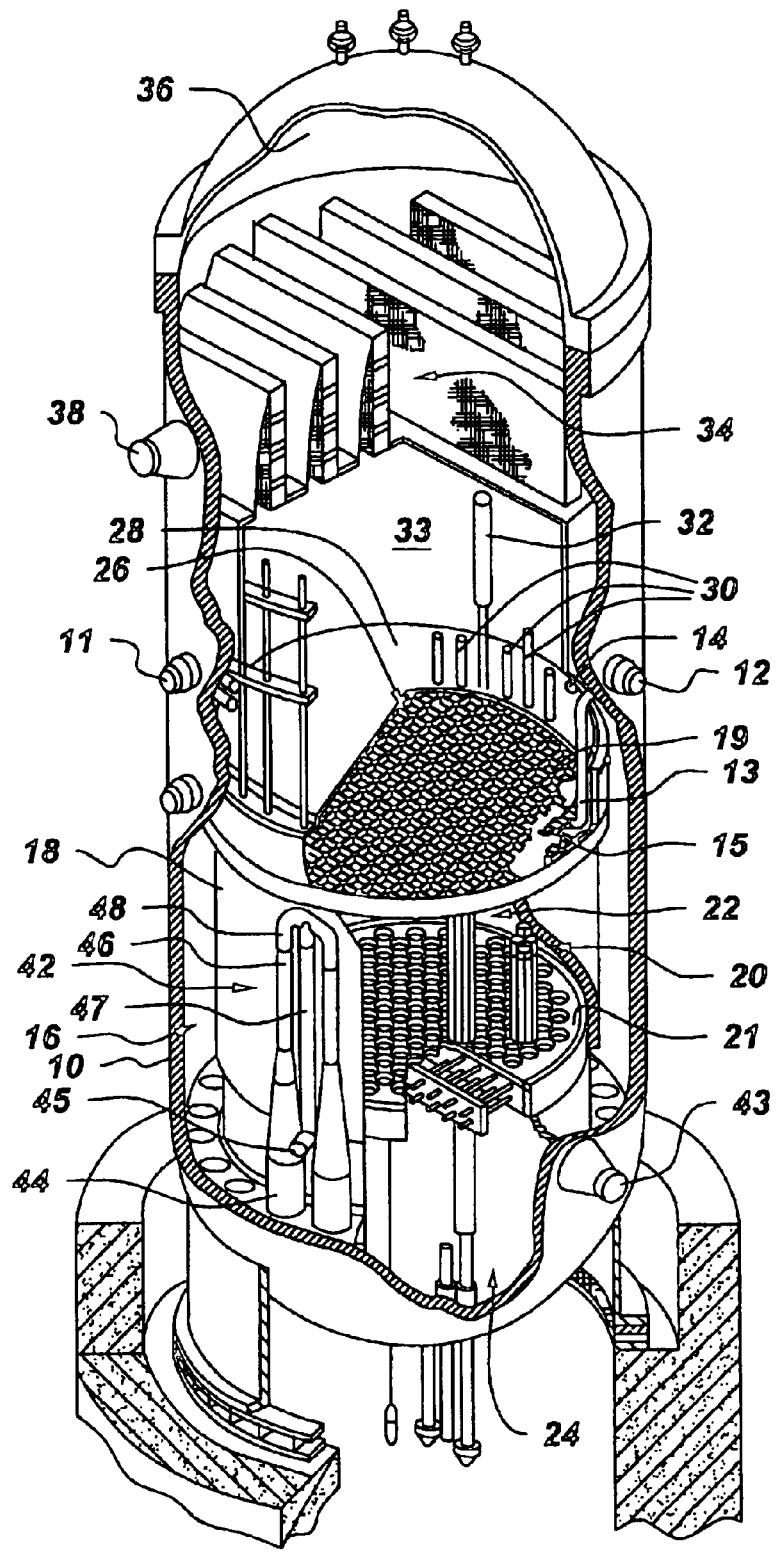
FIG. 2 is a schematic showing a partial cutaway perspective view of a conventional BWR.

The fluid flow in a boiling water reactor will be generally described with reference to FIG. 2. Feed water is admitted into a reactor pressure vessel (RPV) 10 via a feed water inlet 12 and a feed water sparger 14, which is a ring-shaped pipe having suitable apertures for circumferentially distributing the feed water inside the RPV. A core spray inlet 11 supplies water to a core spray sparger 15 via core spray line 13. The feed water from feed water sparger 14 flows downwardly through the down corner annulus 16, which is an annular region between RPV 10 and core shroud 18. Core shroud 18 is a stainless steel cylinder, which surrounds the core 20 comprising numerous fuel assemblies 22 (only two 2×2 arrays of which are depicted in FIG. 2). Each fuel assembly is supported at the top guide 19 and at the bottom by core plate 21. Water flowing through downcomer annulus 16 then flows to the reactor lower plenum 24.

The water subsequently enters the fuel assemblies 22 disposed within core 20, wherein a boiling boundary layer (not shown) is established. A mixture of water and steam enters reactor upper plenum 26 under shroud head 28. Reactor upper plenum 26 provides standoff between the steam-water mixture exiting core 20 and entering vertical standpipe 30, which are disposed atop shroud head 28 and in fluid communication with reactor upper plenum 26.

The steam-water mixture flows through standpipes 30 and enters steam separators 32, which are of the axial-flow centrifugal type. The separated liquid water then mixes with feed water in the mixing plenum 33, which mixture then returns to the core via the downcomer annulus and/or through jet pump assemblies. The steam passes through steam dryers 34 and enters steam dome 36. The steam is withdrawn from the RPV via steam outlet 38.

The BWR also includes a coolant recirculation system, which provides the forced convection flow through the core necessary to attain the required power density. A portion of the water is sucked from the lower end of the downcomer annulus 16 via recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers.

The present disclosure is directed to a method of reducing the electrochemical corrosion potential of a component (i.e., structural material) exposed to high temperature water in a hot water system, which includes providing a reducing species to the high temperature water, providing a plurality of catalytic and dielectric nanoparticles to the high temperature water, wherein the catalytic nanoparticles provide a catalytic surface on which the reducing species reacts with the at least one oxidizing species present in the high temperature water, and wherein the dielectric nanoparticles provide insulative protection to the surfaces, regardless of the water chemistry conditions, and correspondingly reducing the electrochemical corrosion potential of the component.

The introduction of the catalytic and dielectric nanoparticles into the high temperature water of reactors, such as the BWR described above, advantageously protects the reactor components and reduces the oxidizing properties of the high temperature water. The nanoparticles comprise both dielectric nanoparticles and catalytic nanoparticles and/or nanoparticles having both dielectric and catalytic properties, i.e., each nanoparticle possesses both a catalytic functionality and a dielectric functionality. Although described with respect to a BWR, the present disclosure is not intended to be limited to use in BWRs and is applicable to the primary and secondary sides of PWRs. Other suitable structures include those structural components that are exposed to high temperature water environments. Such structures include pressurized water reactors, steam driven turbines, water deaerators, and the like. As used herein, the term high temperature water refers to water having a temperature between about 50° C. and about 320° C., and preferably, between about 50° C. and about 290° C.

As used herein, the term "nanoparticles" is defined as discrete particles with average diameters less than about 100 nanometers (nm). More preferably, the nanoparticles have diameters of about 1 nm to about 100 nm, and with about 5 nm to about 50 nm even more preferred. Due to the large fraction of atoms located at the surface, nanoparticles possess very unique electrical, magnetic, mechanical, and optical properties, such as, but not limited to, increased surface area and the ability to form colloidal suspensions. Particles having a diameter of about 9 nm, for example, may have a surface area of about 97 $m^2/g$ when fully dispersed. In the present disclosure, the nanoparticles preferably have a surface area of about 1 $m^2/g$ to about 300 $m^2/g$, and more preferably, a surface area of about 10 $m^2/g$ to about 100 $m^2/g$.

The nanoparticles generally comprise both dielectric non-noble metal nanoparticles and a catalytic noble metal nanoparticles, and/or nanoparticles comprising a mixture of both catalytic noble metal and dielectric non-noble metals, i.e., each nanoparticle is comprised of both catalytic and dielectric functional materials. While not wanting to be bound by theory, it is believed that upon introduction of the nanoparticles in the high temperature water, the nanoparticles are colloidally dispersed in the water to provide protection to the reactor components from the detrimental effects of the high temperature water. In particular, the catalytic nanoparticles catalytically increase the efficiency of the recombination kinetics for hydrogen and oxygen to lower the electrochemical corrosion potential of the water. The dielectric nanoparticles provide insulative barrier protection properties to reactor surfaces proximate to or in contact therewith. Some of the nanoparticles, e.g., catalytic noble metal component and/or dielectric component, may also deposit onto surfaces of the components in contact with the high temperature water to provide continued protection. Once deposited onto the component surfaces, the nanoparticles may redeposit onto other component surfaces during operation or become colloidally dispersed in the high temperature water.

Upon introduction of the nanoparticles to the reactor, the nanoparticles are colloidally dispersed throughout the water and are responsive to electrostatic forces in the water. As a result, redistribution of the nanoparticles can occur on various component surfaces of the reactor. In addition, it has been found that the catalytic efficiency is greatly improved due to the increased surface area provided by the use of nanoparticles, relative to coated articles. Thus, the presence of the catalytic nanoparticles and/or the dielectric nanoparticles can reduce the oxidizing power of the water and at the same time, can lead to the formation of an insulated and/or catalytic deposits on surfaces of the reactor components. In addition, such nanoparticles are capable of penetrating or diffusing into the existing crevice and thus inhibit further growing.

Examples of suitable metals for forming the various reactor components to be protected are nickel based alloys, cobalt based alloys, titanium based alloys, copper based alloys, and ferrous and non-ferrous alloys. Carbon steels and low alloy steels are further examples.

In a preferred embodiment, a mixture of nanoparticles including both dielectric nanoparticles and catalytic nanoparticles are introduced into the high temperature water. In another embodiment, each nanoparticle is fabricated as a mixture of both the dielectric component and the catalytic component, wherein all or a portion of the catalytic component contacts the high temperature water upon immersion therein. Advantageously, the use of the nanoparticles as disclosed herein reduces the electrochemical corrosion potential without the need to continuously monitor variables such as dissolved hydrogen/oxygen levels, flow rates, temperature gradients, radiation fluxes, and the like, which are generally difficult to accurately monitor in BWRs and other like reactors.

The nanoparticles may have a variety of morphologies, including single-lobed such as spherical, substantially spherical, cigar-shaped, rod-shaped and moon-shaped, and multi-lobed such as tetrahedral, raspberry, acorn, dumb-bell, and the like. The size distribution of the nanoparticles may be monodisperse, bimodal, or polydisperse. In a preferred embodiment, the nanoparticles have an average diameter less than about 100 nanometers.

The nanoparticles are formed using conventional techniques leading to a wide variation in the amount of agglomeration of particles. As those skilled in the art will appreciate, the stoichiometry of the metals (non-noble metals and noble metals) will establish the ratio of the metal in the final product Typically, nanoparticles need to be dispersed to take advantage of their unique properties. Particle dispersion can be divided into three stages: wetting; separation of particles; and stabilization. Once wetted, the breakdown of agglomerates is usually achieved by collision or attrition. Methods used to disperse the nanoparticles include ultrasonic energy, vigorous mixing, vigorous spraying, and the like. Nanoparticles, once dispersed, can remain in a colloidal suspension indefinitely due to Brownian motion.

Oxidizing species present in the high temperature water include, but are not limited to, oxygen ($O_2$), hydrogen peroxide ($H_2O_2$), and various radicals, such as OH-, and the like. Reducing species include, but are not limited to, hydrogen ($H_2$), hydrazine ($N_2H_2$), ammonia ($NH_3$), alcohols, and the like. In a preferred embodiment, a catalytic nanoparticle provides a catalytic surface upon which hydrogen reacts with oxygen and hydrogen peroxide to form water. The reductants may already be present in the high temperature reactor water in equilibrium concentrations. Alternatively, the reductants may be introduced into the high temperature water and dissolved therein. In one such embodiment, an amount of hydrogen gas is introduced into the high temperature water such that the ratio of $H_2O_2$ in the high temperature water has a value determined by weight of about 1:8.

The dielectric nanoparticles preferably comprise a non-noble metal material. Suitable dielectric materials for fabricating the nanoparticles include, but are not intended to be limited to, inorganic or organometallic compounds, metals, zeolites, metal oxides, and the like. Examples of non-noble metals include zirconium, hafnium, niobium, tantalum, yttrium, ytterbium, tungsten, vanadium, titanium, molybdenum, chromium, cerium, germanium, scandium, lanthanum, and nickel. It is also possible to use non-noble metals that possess conducting or semiconducting properties such as carbon, or silicon. The non-noble metal identified above can be used alone or in admixture with other non-noble metals or non-metals.

The catalytic nanoparticles preferably comprise at least one of platinum, palladium, osmium, rhodium, ruthenium, iridium, oxides, nitrides, borides, phosphides and mixtures of these metals. Preferably, the plurality of catalytic nanoparticles comprises at least one of palladium, platinum, rhodium, and combinations thereof. Additionally, the plurality of catalytic nanoparticles may comprise other chemical compounds containing at least one of platinum, palladium, osmium, ruthenium, iridium, and rhodium. Such compounds include intermetallic compounds formed with other elements.

The ratio of catalytic nanoparticles to dielectric nanoparticles will depend on the desired application and can vary widely as any ratio can be employed. Upon introduction into the reactor, the concentration of the catalytic nanoparticles is preferably less than about 100 parts per billion (ppb), preferably about 1 parts per trillion (ppt) to about 10 ppb, and even more preferably, about 10 ppt to about 1 ppb. The concentration of the dielectric nanoparticles is preferably less than about 100 ppb, preferably about 1 ppt to about 10 ppb, and even more preferably, about 10 ppt to about 1 ppb.

In one embodiment of the present invention, the nanoparticles are deposited onto the component surfaces to provide a heterogeneous catalysis site and form a protective insulative layer. In another embodiment however, the plurality of nanoparticles are sufficiently buoyant to remain in a colloidal suspension in the high temperature water and act as homogenous catalysts for the reaction between oxidizing and reducing species within the high temperature water, and also provide insulative properties due to the proximity of the dielectric nanoparticles to the reactor surfaces. The presence of a colloidal suspension of nanoparticles having a high surface area in the BWR water—when coupled with the presence of a stoichiometric excess of reductant—may cause an increase in radioactivity resulting from increased volatility of N-16 compounds that are produced by transmutation of O-16 to N-16 in the reactor core, otherwise known as "turbine shine." This method of providing the nanoparticles to the high temperature water may require that injection of the reductant (e.g., $H_2$) be temporarily suspended when the nanoparticles are initially introduced into the reactor to minimize the production of N-16 containing species. The electrochemical corrosion potential of the reaction components can be lowered in situ by providing the nanoparticles directly to the reactor feedwater, thus eliminating the need to remove the components for treatment with noble metal powders. The nanoparticles may be provided to the BWR feedwater during reactor operation, thus avoiding expensive and complicated BWR shutdowns. Alternatively, the nanoparticles may be added to the reactor feedwater during a scheduled reactor shutdown. Depending on the needs of the respective nuclear reactor, a predetermined amount of the nanoparticles can be introduced into the high temperature water in the reactor either continuously or incrementally at predetermined time intervals. Predetermined quantities of the catalytic nanoparticles can be introduced into the BWR to obtain a predetermined concentration of the catalytic nanoparticles in the high temperature reactor water.

Several options are available for introducing the catalytic nanoparticles in situ into the thigh temperature water to reduce the electrochemical corrosion potential. The nanoparticles can be introduced homogeneously so as to create colloidal floaters within the BWR, wherein the nanoparticles remain in colloidal suspension indefinitely due to Brownian motion. Alternatively, the nanoparticles can be introduced heterogeneously such that the nanoparticles deposit on the BWR component surfaces.

The nanoparticles may be provided to the high temperature water by first preparing a concentrated solution or suspension of the nanoparticles, using fluid media well known to those skilled in the art, and subsequently delivering the concentrated suspension to the reactor feedwater. Suitable media for forming such concentrated solutions or suspensions include, but are not limited to: water; alcohols such as methanol, ethanol, propanol, and n-butanol; and acids such as lower carboxylic acids, e.g. acetic acid, propionic acid, and butyric acid; or ketones such as acetone and acetylacetone; and combinations thereof. The nanoparticles may also be entrained in gaseous fluid media, such as air. Alternatively, the nanoparticles may be introduced in nondispersed metallic form into the reactor feedwater.

The nanoparticles may be introduced into the high temperature water during various stages of operation of the reactor. The nanoparticles may be provided to the high temperature water in any of the embodiments described above during full power operation, cool down, outage, heat-up, hot standby, or low power operation of the reactor. Moreover, the nanoparticles may be introduced into the high temperature water at any location within the reactor structure where thorough mixing of the nanoparticles in the high temperature water can occur. The locations at which the nanoparticles may be introduced into the high temperature water include, but are not necessarily limited to, residual heat removal (RHR) piping, recirculation piping, feedwater lines, core delta P lines, jet pump instrumentation lines, control rod drive cooling water lines, water level control points, reactor water clean-up (RWCU) systems, and the like. The various lines may be either open or closed to the remainder of the coolant system during introduction of the catalytic nanoparticles.

The temperature of the high temperature reactor water when the catalytic nanoparticles are introduced into to the reactor water is typically in the range between about 50° C. and about 290° C. for BWR reactors, and between about 50° C. and about 320° C. for PWR reactors. The temperature is generally in the range of 100–177° C. and, most frequently, between about 170° C. and about 185° C. If the nanoparticle addition is performed at full power operation, the reactor water temperature is between about 270° C. and about 290° C.

The following examples are provided to illustrate some embodiments of the present disclosure. They are not intended to limit the disclosure in any aspect.

EXAMPLE 1.

Figure 3:
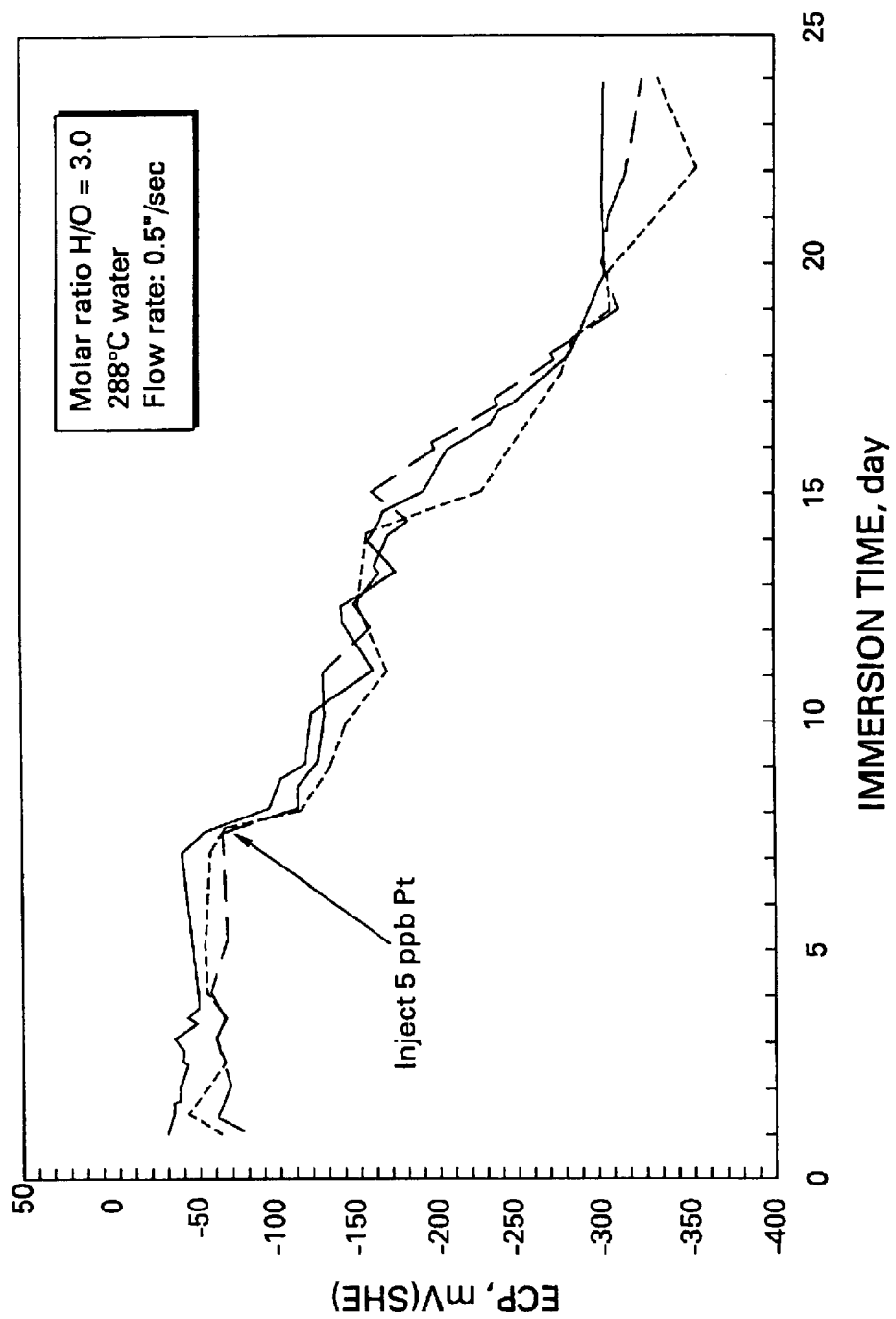
FIG. 3 graphically illustrates electrochemical corrosion potential as a function of immersion time in 288° C. water containing excess hydrogen before and during platinum nanoparticle injection.

In this example, the catalytic effect of nanoparticle addition in a simulated BWR environment was studied by introducing the platinum nanoparticles into water held at 288° C. and containing excess hydrogen. FIG. 3 graphically illustrates the corrosion potential behavior for Type 304 stainless steel electrodes as a function of immersion time in the 288° C. high temperature water containing excess the hydrogen (molar ratio H/O=3.0). Prior to injection of 5 ppb of platinum nanoparticles, the corrosion potential was relatively constant at about −50 mV over a 5-day period. Upon addition of the catalytic nanoparticles, the corrosion potential steadily dropped over the next 20 days of monitoring indicating that the catalytic nanoparticles are highly effective in lowering electrochemical corrosion potential in a simulated BWR environment, i.e., a high efficiency of recombination kinetics for oxygen and hydrogen. Thus, the results indicate that the presence of the catalytic nanoparticles catalytically enhances the kinetics in the formation of water by oxygen and hydrogen present in the high temperature water, thereby reducing the electrochemical corrosion potential of the stainless steel electrodes.

Figure 4:
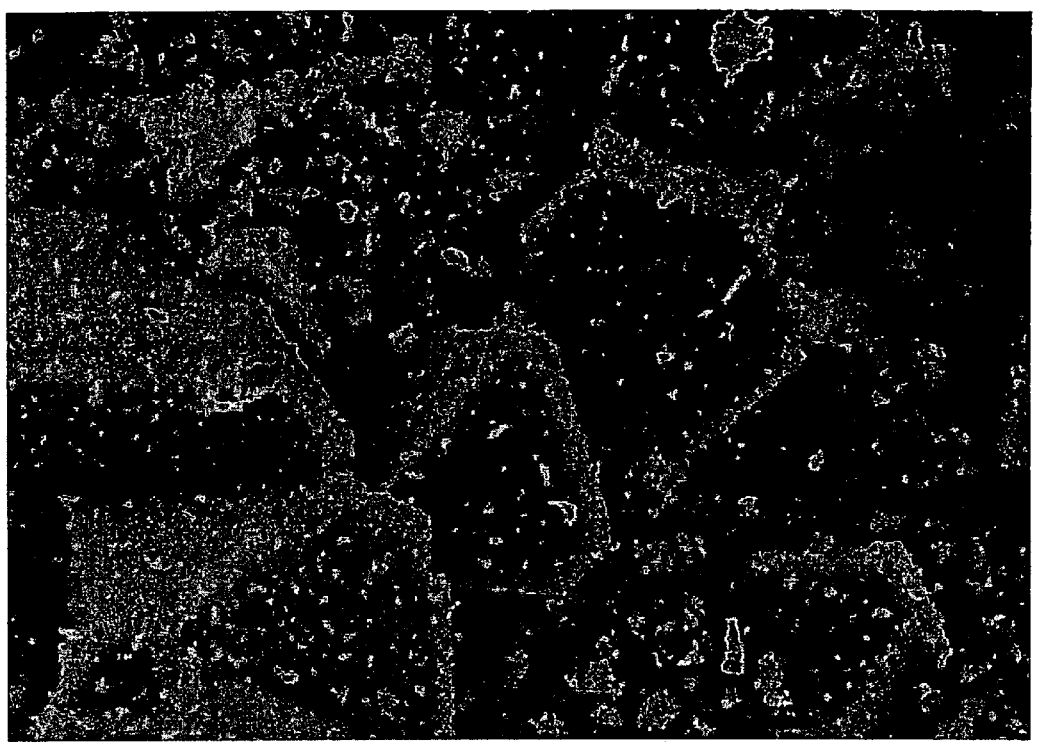
FIG. 4 illustrates a scanning electron micrograph of platinum nanoparticles on Type 304 stainless steel that were injected into high temperatrure water of 288° C. for 12 days.

FIG. 4 is a scanning electron micrograph showing the size and distribution of the platinum nanoparticles on the Type 304 stainless steel oxide surface. The platinum nanoparticles were injected for 12 days to high temperature water at 288° C.

EXAMPLE 2.

Figure 5:
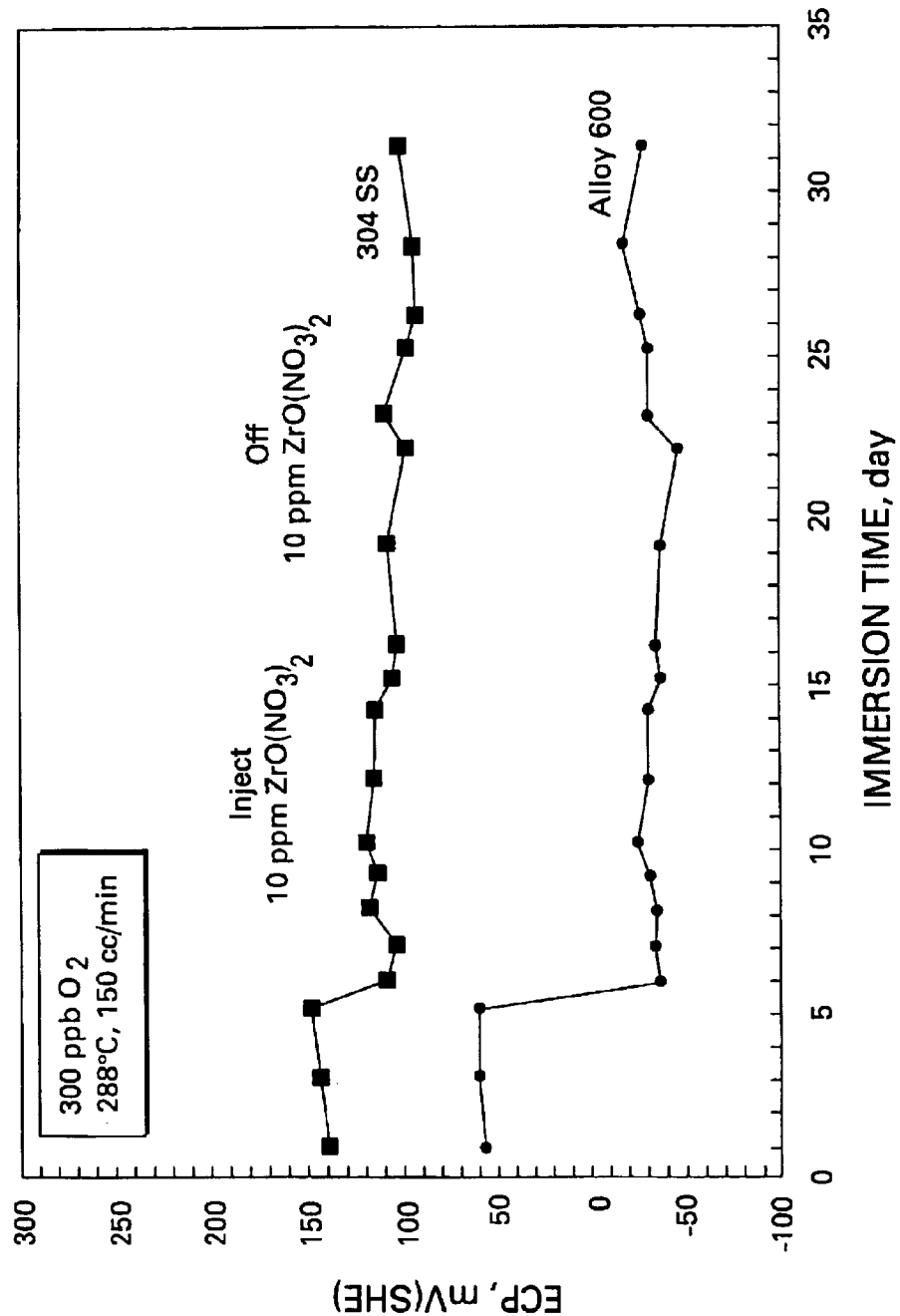
FIG. 5 graphically illustrates electrochemical corrosion potential as a function of immersion time in 288° C. water for Type 304 stainless steel and alloy 600 electrodes with and without the addition of 10 ppm $ZrO(NO_3)_2$.

In this example, in situ deposition of a dielectric nanoparticle was conducted to study the effectiveness of longer in situ deposition times. Coupons of Type 304 stainless steel and alloy 600 were immersed in 288° C. water containing 300 ppb of dissolved oxygen for a period of about 31 days. Test electrodes were first immersed in the 300 ppb dissolved oxygen water for a period of about 5 days. After about 5 days, 10 ppm $ZrO(NO_3)_2$ was continuously injected into the water for a period of about 14 days, wherein a dramatic initial reduction in ECP is observed for both specimens, as shown in FIG. 5. After about 22 days, the flow of 10 ppm $ZrO(NO_3)_2$ into the water was discontinued, wherein a marginal increase in electrochemical corrosion potential was observed. It is evident that the addition of $ZrO(NO_3)_2$ to 300 ppb dissolved oxygen water decreased ECP by 50 to 100 mV. Also, the presence of the high oxygen conditions may enhance formation of $ZrO_2.H_2O$ on the surface of the specimens.

Advantageously, the catalytic nanoparticles provide a high efficiency of recombination kinetics, while the dielectric nanoparticles restricts mass transport of oxidants through the oxide layer to the substrate. Moreover, the use of nanoparticles provides a colloidal behavior that permits redistribution to occur. Thus, the presence of the catalytic component on the surface of the dielectric component can reduce the oxidizing power of water, and simultaneously, provide an insulative layer onto surfaces of the reactor.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for mitigating stress corrosion cracking of a component exposed to high temperature water in a hot water system in which the presence of at least one oxidizing species in the high temperature water raises an electrochemical corrosion potential of the component, comprising:
   introducing a reducing species to the high temperature water;
   introducing catalytic nanoparticles and dielectric nanoparticles into the high temperature water; and
   forming a catalytic site and an insulative barrier on or about the component to reduce the electrochemical corrosion potential of the high temperature water.

2. The method according to claim 1, wherein introducing the catalytic and dielectric nanoparticles into the high temperature water provides a catalytic site for reacting the reducing species with the at least one oxidizing species.

3. The method according to claim 1, wherein the catalytic nanoparticles comprise at least one of platinum, palladium, osmium, rhodium, ruthenium, iridium, rhenium, oxides thereof, nitrides thereof, borides thereof, phosphides thereof, and combinations thereof.

4. The method according to claim 1, wherein the dielectric nanoparticles comprise a non-noble metal selected from the group consisting of zirconium, hafnium, niobium, tantalum, yttrium, ytterbium, tungsten, vanadium, titanium, molybdenum, chromium, cerium, germanium, scandium, lanthanum, oxides thereof, and combinations thereof.

5. The method according to claim 1, wherein the high temperature water has a temperature of about 50° C. to about 320° C.

6. The method according to claim 1, wherein the oxidizing species are oxygen, hydrogen peroxide, and hydroxyl radicals, and wherein the step of providing a reducing species to the high temperature water comprises dissolving a quantity of hydrogen gas in the high temperature water such that the ratio $H_2$/oxidants in the high temperature water has a value determined by weight of about 1:8.

7. The method according to claim 1, wherein the at least one oxidizing species comprises oxygen, hydrogen peroxide, or hydroxyl radicals.

8. The method according to claim 1, wherein the reducing species comprises hydrogen, alcohol, hydrazine, or ammonia.

9. The method according to claim 1, wherein catalytic nanoparticles and dielectric nanoparticles have a particle size of less than about 100 nm.

10. The method according to claim 1, wherein the catalytic nanoparticles and the dielectric nanoparticles have a particle size of about 5 nm to about 50 nm.

11. The method according to claim 1, wherein the catalytic nanoparticles and the dielectric nanoparticles have a surface area of about 1 $m^2$/g to about 300 $m^2$/g.

12. The method according to claim 1, wherein the catalytic nanoparticles and the dielectric nanoparticles have a surface area of about 10 $m^2$/g to about 100 $m^2$/g.

13. The method according to claim 1, wherein introducing catalytic nanoparticles and dielectric nanoparticles into the high temperature water provides a concentration of less than about 100 ppb for the catalytic nanoparticles and less than about 100 ppb for the dielectric nanoparticles.

14. The method according to claim 1, wherein introducing catalytic nanoparticles and dielectric nanoparticles into the high temperature water provides a concentration of less than about 10 ppb for the catalytic nanoparticles and less than about 10 ppb for the dielectric nanoparticles.

15. The method according to claim 1, wherein introducing the catalytic nanoparticles and the dielectric nanoparticles into the high temperature water provides a concentration of about 1 ppt to about 1 ppb for the catalytic nanoparticles and a concentration of about 1 ppt to about 1 ppb for the dielectric nanoparticles.

16. The method according to claim 1, wherein the hot water system comprises a nuclear reactor, a steam driven turbine, or a water deaerator.

17. A method for mitigating stress corrosion cracking of a component exposed to high temperature water in a hot water system in which the presence of at least one oxidizing species in the high temperature water raises an electrochemical corrosion potential of the component, comprising:

introducing a reducing species to the high temperature water;

introducing nanoparticles to the high temperature water and forming a colloidal suspension of the nanoparticles, wherein the nanoparticles comprise a mixture of catalytic nanoparticles and dielectric nanoparticles; and catalytically reducing a concentration of the at least one oxidizing species in the high temperature water and forming a protective barrier about the component.

18. The method according to claim 17, wherein catalytically reducing the concentration of the at least one oxidizing species comprises reacting the reducing species with the at least one oxidizing species and homogeneously catalyzing at least one reaction between the reducing species and the at least one oxidizing species.

19. The method according to claim 17, wherein catalytically reducing the concentration of the at least one oxidizing species comprises reacting the reducing species with the at least one oxidizing species and heterogeneously catalyzing at least one reaction between the reducing species and the at least one oxidizing species.

20. The method according to claim 17, wherein the catalytic nanoparticles comprise at least one of platinum, palladium, osmium, rhodium, ruthenium, iridium, rhenium, oxides thereof, nitrides thereof, borides thereof, phosphides thereof, and combinations thereof.

21. The method according to claim 17, wherein the dielectric nanoparticles comprise a non-noble metal selected from the group consisting of zirconium, hafnium, niobium, tantalum, yttrium, ytterbium, tungsten, vanadium, titanium, molybdenum, chromium, cerium, germanium, scandium, lanthanum, oxides thereof, and combinations thereof.

22. The method according to claim 17, wherein introducing the catalytic nanoparticles and the dielectric nanoparticles into the high temperature water provides a concentration of less than about 100 ppb for the catalytic nanoparticles and less than about 100 ppb for the dielectric nanoparticles.

23. The method according to claim 17, wherein the catalytic nanoparticles and the dielectric nanoparticles have a surface area of about 1 $m^2$/g to about 300 $m^2$/g.

24. The method according to claim 17, wherein the at least one oxidizing species comprises oxygen, hydrogen peroxide, or hydroxyl radicals.

25. The method according to claim 17, wherein the reducing species comprises hydrogen, hydrazine, alcohol, or ammonia.

26. A method for mitigating stress corrosion cracking of a component exposed to high temperature water in a hot water system in which the presence of at least one oxidizing species in the high temperature water raises an electrochemical corrosion potential of the component, comprising:

introducing nanoparticles to the high temperature water in an amount effective to reduce a corrosion potential of the high temperature water, wherein the nanoparticles comprise a combination of a catalytic material and a dielectric material.

27. The method according to claim 26, wherein the catalytic material comprises platinum, palladium, osmium, rhodium, ruthenium, iridium, rhenium, oxides thereof, nitrides thereof, borides thereof, phosphides thereof, and combinations thereof, and wherein the dielectric material comprises a non-noble metal selected from the group consisting of zirconium, hafnium, niobium, tantalum, yttrium, ytterbium, tungsten, vanadium, titanium, molybdenum, chromium, cerium, germanium, scandium, lanthanum, oxides thereof, and combinations thereof.

* * * * *